(12) United States Patent
Fraden

(10) Patent No.: US 8,517,603 B2
(45) Date of Patent: Aug. 27, 2013

(54) MULTI-SITE ATTACHMENTS FOR EAR THERMOMETERS

(75) Inventor: Jacob Fraden, San Diego, CA (US)

(73) Assignee: Kaz USA, Inc., Southborough, MA (US)

( * ) Notice: Subject to any disclaimer, the term of this patent is extended or adjusted under 35 U.S.C. 154(b) by 214 days.

(21) Appl. No.: 12/897,466

(22) Filed: Oct. 4, 2010

(65) Prior Publication Data
US 2011/0110395 A1 May 12, 2011

Related U.S. Application Data

(60) Provisional application No. 61/278,114, filed on Oct. 5, 2009.

(51) Int. Cl.
*G01J 5/26* (2006.01)
*G01K 1/08* (2006.01)

(52) U.S. Cl.
USPC ........... 374/121; 374/163; 374/158; 374/208; 374/209; 600/549; 600/474

(58) Field of Classification Search
USPC ................... 374/120, 121, 208, 141, 158, 16, 374/209, 163; 600/549, 474
See application file for complete search history.

(56) References Cited

U.S. PATENT DOCUMENTS

| | | | | |
|---|---|---|---|---|
| 5,066,142 A * | 11/1991 | DeFrank et al. | ............... | 374/208 |
| 5,340,215 A * | 8/1994 | Makita et al. | ................. | 374/121 |
| 5,411,032 A * | 5/1995 | Esseff et al. | ................... | 600/549 |
| 5,487,607 A * | 1/1996 | Makita et al. | ................. | 374/158 |
| 6,149,297 A * | 11/2000 | Beerwerth et al. | ............ | 374/121 |
| 6,367,973 B2 * | 4/2002 | Yamaka | ......................... | 374/158 |
| 6,612,735 B2 * | 9/2003 | Tomioka et al. | .............. | 374/121 |
| 7,651,265 B2 * | 1/2010 | Yang et al. | ..................... | 374/121 |
| 7,815,367 B2 * | 10/2010 | Lane et al. | ..................... | 374/121 |
| 8,197,132 B2 * | 6/2012 | Bisch et al. | ..................... | 374/169 |
| 8,231,271 B2 * | 7/2012 | Lane et al. | ..................... | 374/158 |
| 2002/0131473 A1* | 9/2002 | Konno | ......................... | 374/121 |
| 2006/0215728 A1* | 9/2006 | Jang | .............................. | 374/121 |
| 2007/0058692 A1* | 3/2007 | Huang et al. | .................. | 374/209 |
| 2007/0291820 A1* | 12/2007 | Yang et al. | ..................... | 374/121 |
| 2008/0285618 A1* | 11/2008 | Chen | ............................. | 374/121 |
| 2010/0017163 A1* | 1/2010 | Yamaguchi et al. | ............ | 702/99 |
| 2011/0134962 A1* | 6/2011 | Fraden | ......................... | 374/209 |

* cited by examiner

*Primary Examiner* — Gail Verbitsky
(74) *Attorney, Agent, or Firm* — Stroock & Stroock & Lavan LLP

(57) ABSTRACT

A thermometer that enables the measurement of temperature from multiple body sites comprising a body portion that has a circuit configured to measure an IR signal and convert it into an output that accurately reflects body temperature and a switch in communication with the circuit. The thermometer also comprises a probe that has an IR window configured to accept an IR signal and an attachment mechanism coupled to the probe which comprises a generally circular hollow bore at its distal end, fastening members to engage the body of the thermometer and a pin at its proximal end for interacting with the switch on the body of the thermometer. When the attachment mechanism couples to the probe, the pin interacts with the switch in various positions and the circuit converts the signal based upon the position of the switch which position reflects the location from which the temperature measurement was taken.

16 Claims, 2 Drawing Sheets

MULTI-SITE ATTACHMENTS FOR EAR THERMOMETERS

CROSS REFERENCE TO RELATED APPLICATION

This application claims the benefit of provisional application Ser. No. 61/278,114 filed on Oct. 5, 2009 entitled "MULTI-SITE ATTACHMENTS FOR EAR THERMOMETERS", the entire disclosure of which is incorporated herein by reference.

BACKGROUND OF THE INVENTION

1. Field of the Invention

This invention relates to devices for measuring temperature, more specifically to infrared thermometers primarily intended for medical applications.

2. Description of the Related Art

An infrared (IR) medical ear thermometer is well known in the art. A typical ear thermometer comprises an infrared sensor being coupled to a probe that is adapted for partial insertion into an ear canal and is aimed in the direction of the tympanic membrane. This device essentially is a non-contact optoelectronic device that measures intensity of infrared radiation that emanates from the ear canal surface area and the device converts the IR signal into an output temperature reading. These thermometers are exemplified by U.S. Pat. Nos. 4,797,840 and 4,854,730 issued to Fraden. When designed correctly, IR ear thermometers can be very accurate instruments and enjoy a deserved acceptance in the medical services. Most of the IR ear thermometers operate with disposable or reusable probe covers that envelope a portion of the probe that may come in contact with the patient's skin. These probe covers incorporate a polymer membrane which is substantially transparent to IR radiation. The probe covers are exemplified by U.S. Pat. No. 5,795,067 issued to Fraden et al.

Even though an ear IR thermometer is a non-contact instrument and generally considered non-invasive, in practice it still requires insertion into the patient's ear canal and thus can be somewhat disturbing, especially for pediatric patients. One skilled in the art of medical thermometry would also know of an alternative, albeit less accurate IR thermometer that measures the IR (thermal) radiation from the patient's external body surface such as a forehead in the temporal region. A probe of the surface thermometer is in direct contact with the skin and also may be moved along the skin in order to locate the warmest skin region. These thermometers are exemplified by U.S. Pat. No. 6,292,685 issued to Pompei. A disposable probe cover also can be used together with this type of a thermometer. The probe cover is exemplified by U.S. Pat. No. 6,932,775 issued to Pompei. Some efforts have been made to modify the IR thermometer by employing special probes for different body sites, such as the ear, axilla, or forehead. This is exemplified by the teachings of U.S. Patent Publication No. 2007/0189358 issued to Lane et al. Another application of an IR medical thermometer is for measurements of temperatures from a distance ranging from a few centimeters to a few meters with no contact with the patient whatsoever. These devices closely relate to thermal imaging systems and are exemplified by U.S. Pat. No. 4,498,881 issued to Everest, U.S. Pat. No. 7,340,293 issued to McQuilkin, and U.S. Patent Application Publication No. 2007/0153871 to Fraden. The entire disclosure of the above mentioned patents and patent applications are incorporated by reference herein.

All the above referenced devices have at least one thing in common—an IR sensor. This sensor is an essential part of the most popular medical IR thermometer—an ear thermometer. It would be highly desirable instead of using separate thermometers or attachments for various body sites to use just one ear thermometer that can be adapted for use with multiple sites of the human body. Thus, there is a need for a thermometer that can be easily converted from an IR ear thermometer to an IR thermometer that can be used on other body sites, either by means of touching the patient or a contactless measurement.

SUMMARY OF THE INVENTION

In view of the above discussion and the shortcomings in the prior art, the invention seeks to overcome such shortcomings of the prior art by providing an infrared thermometer that can be used to measure temperature from a skin surface and/or via an ear canal.

According to one embodiment of the present invention the infrared thermometer comprises a body portion that has one or more protruding members, an electronic circuit that is configured to measure the intensity of an infrared signal received from a patient and convert the signal into an output that accurately reflects the patient's body temperature and a switch that is in communication with the circuit. The thermometer also comprises a probe that has an infrared window configured to accept the infrared signal received from the patient and an attachment mechanism coupled to the probe which comprises a generally circular hollow bore at its distal end, one or more fastening members to engage the one or more protruding members and a pin at its proximal end for interacting with the switch on the body of the thermometer. When the attachment mechanism is coupled to the probe and the pin interacts with the switch in one position, the circuit converts the signal based upon a first calculation for a particular temperature measurement (e.g., via the ear canal) and when the pin interacts with the switch in a second position, the circuit converts the signal based upon a second calculation for a second temperature measurement (e.g., skin surface temperature).

BRIEF DESCRIPTION OF THE DRAWINGS

The foregoing summary, as well as the following detailed description of preferred embodiments of the application, will be better understood when read in conjunction with the appended drawings wherein like reference numerals refer to like components. For the purposes of illustrating the device of the present application, there is shown in the drawings preferred embodiments. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The drawings are not necessarily drawn to scale and are not in any way intended to limit the scope of this invention, but merely to clarify a single illustrated embodiment of the invention. In the drawings.

DETAILED DESCRIPTION OF THE PREFERRED EMBODIMENTS

Certain exemplary embodiments of the invention will now be discussed with reference to the aforementioned figures. In general, such embodiments relate to an infrared (IR) thermometer that includes one or more attachments for measuring skin surface temperature.

Figure 1:
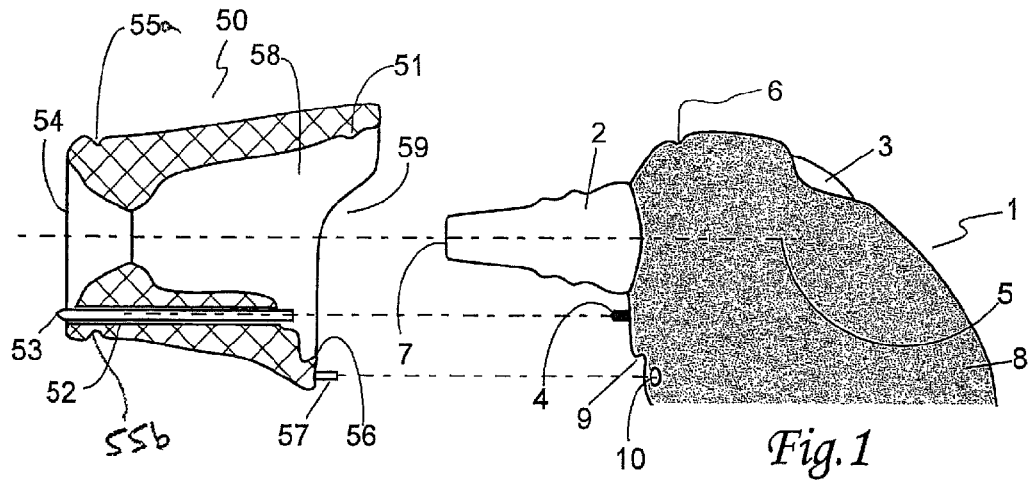
FIG. 1 is a cross-sectional view of an attachment disconnected from an IR thermometer according to one embodiment of the present invention.

As can be seen in FIG. 1, an IR thermometer 1 comprises a body 8 with an operation push button 3 and IR probe 2 that comprises an IR window 7 for accepting a thermal radiation signal. The probe 2 is preferably shaped for insertion in the ear canal of a patient for measuring a patient's temperature via the ear canal. Inside the body 8, there is an electronic circuit (not shown) for measuring intensity of the IR signal, computing from the IR signal a patient's temperature and outputting that temperature for clinical use. Generally, a disposable probe cover (not shown) is inserted onto the probe 2 to prevent contamination of the probe 2 and window 7 by the patient's ear canal interior. Once the probe cover is installed, a thermometer probe switch 4 may be actuated to signal the internal electronic circuit that the probe cover is being installed. The above features describe a generic IR thermometer that is known in the art and is currently mass produced.

According to one embodiment of the present invention, a conventional thermometer 1 is modified by the following changes as shown in FIG. 1. At least one and preferably more snap-on features 6 and 9 are formed on the body 8. These snap-on features are intended to secure the attachment 50 before and during a temperature measurement. In some embodiments, a switch 10 is used to signal to the internal electronic circuit that the attachment is being installed. The signaling enables the electronic circuit to modify the temperature computing algorithm to account for the fact that a different body site is being used to measure the IR signal. It will be appreciated that depending on the site being measured, the circuit may have to compute and/or covert the IR signal in a different manner to output an accurate temperature. Having a switch that allows the circuit to easily recognize where and/or how the IR signal is being measured enables a swifter and more accurate measurement. The attachment 50 can be fabricated of any rigid material, such as Acrylonitrile Butadiene Styrene ("ABS") resin. Generally, the interior of the attachment 50 is a circular hollow bore 58 shaped for insertion over the probe 2. The distal end 54 of attachment 50 is an opening in the hollow bore 58 that allows an IR signal to pass through bore 54 to window 7. The attachment 50 has at least one but preferably more corresponding snaps 51 and 56 that are used to mate with snaps 6 and 10 when the attachment 50 is mated with the thermometer 1. In certain embodiments, use of a probe cover may be desired. To retain the probe cover on the attachment 50, the attachment 50 also comprises retainer notch 55a and 55b and bar 53, which bar can slide inside the tube 52, and is used to accommodate a probe cover. Also, the enabling pin 57 is formed at the proximal side 59 which will be discussed in more detail below.

Figure 2:
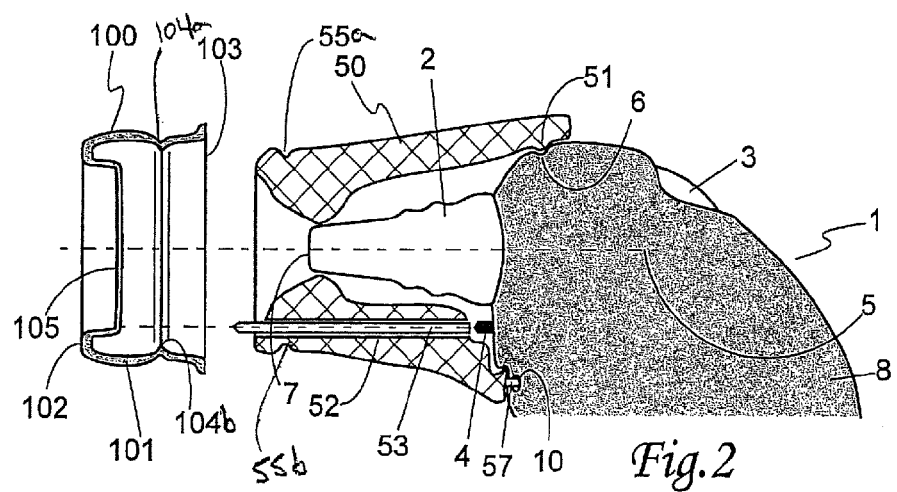
FIG. 2 is a cross-sectional view of an attachment connected to the probe of an IR thermometer according to one embodiment of the present invention.

In practice, when the attachment 50 is placed over the probe 2 as can be seen in FIG. 2, the snap 51 engages the snap-on feature 6 and the probe 2 is aligned with the attachment along optical axis 5. The enabling pin 57 engages and activates switch 10 so that the circuit is alerted that the thermometer 1 will now be receiving the IR signal based on skin contact and the skin temperature operating mode will be activated.

Figure 3:
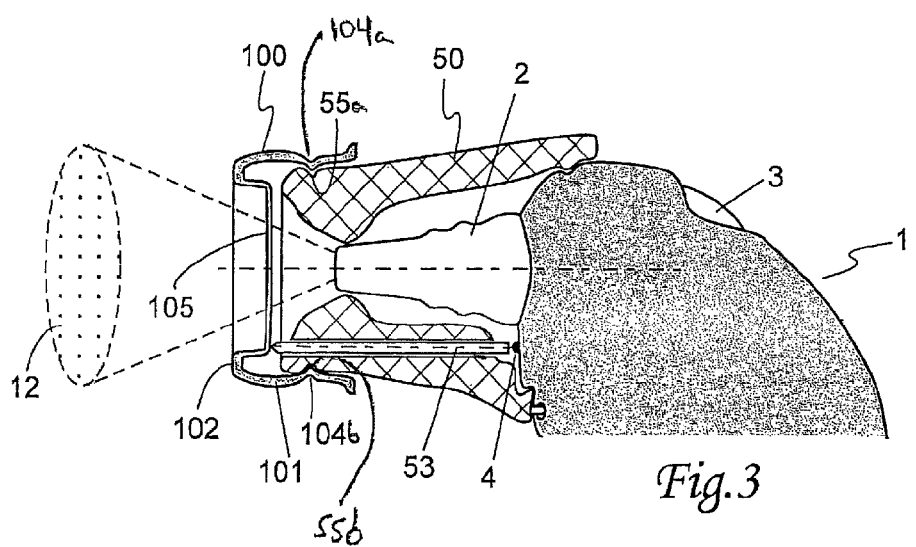
FIG. 3 is a cross-sectional view of the probe cover installed on the attachment according to one embodiment of the present invention.

If a probe cover is used with a particular embodiment, it can also be installed onto the attachment as seen in FIG. 3. The probe cover 100 preferably contains relatively thick side walls 101 (0.004" or more) and a thin frontal membrane 105 that has a typical thickness around 0.001" or less. The probe cover 100 is preferably fabricated of polyethylene, polypropylene or a copolymer that is substantially transparent in the IR range of the spectrum. The membrane 105 of the probe cover 100 is recessed from the edge 102 so that it may come in contact with the patient's skin. Thus, before and during the operation of the thermometer 1, the membrane 105 is prevented from touching the patient. This prevents contamination and makes the temperature taking procedure more sanitary. The edge 102 is preferably relatively thick (0.004" or more) and sculptured for retaining its shape and integrity while being installed and touching the patient's skin. The side walls of the probe cover may contain the grooves 104a and 104b where they can interact with notches 55a and 55b respectively for engaging the probe 100 with the attachment 50. The probe cover may be fabricated by thermoforming it as a unity device. Alternatively, it may be a two-piece device where membrane 105 is welded or otherwise attached to the walls of the probe cover 100 as is known by one of ordinary skill in the art.

FIG. 3 shows the probe cover 100 being installed on the attachment 50 by engaging the grooves 104a and 104b with the notches 55a and 55b, respectively. The probe cover also engages the bar 53 that slides inside the attachment and, in turn, engages the probe switch 4 that signals the electronic circuit that the probe cover 100 is being properly installed. Now, the probe 2 receives IR radiation from the field of view 12 that includes the skin surface of the patient. Since the switch 4 is enabled, the electronic circuit accounts for the signal loss inside the membrane 105 and makes the appropriate adjustment to accommodate for any variation and obtain a more accurate temperature reading.

Figure 4:
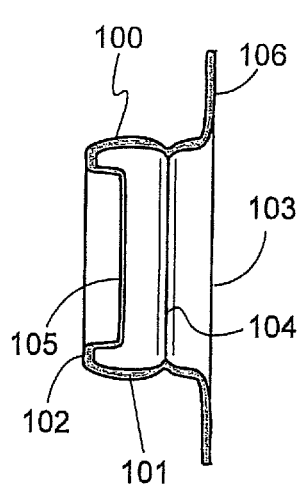
FIG. 4 show a probe cover with a brim according to one embodiment of the present invention.

In one embodiment, a probe cover may be provided with a brim 106 as shown in FIG. 4. The brim makes installation of the probe cover easier and helps to eject the probe cover should the attachment be provided with a probe cover ejector. Such an ejector is well known in the art.

Figure 5:
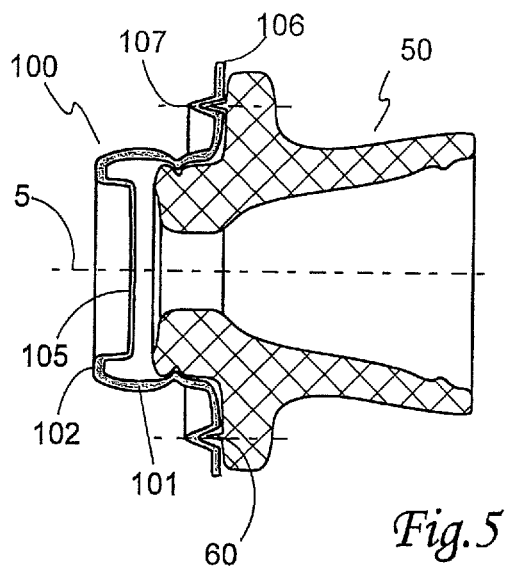
FIG. 5 shows a probe cover with a mating feature installed onto the attachment according to one embodiment of the present invention.

FIG. 5 illustrates a mating feature for the probe cover. This feature can be employed either when the probe cover is used on the attachment or on a probe of any medical IR thermometer. The feature involves forming complimentary shapes on both the attachment 50 and on the probe cover 100. On the probe cover 100, it is a fold 107 that has a complimentary shape with the ridge 60 on the attachment 50. In one embodiment, the probe cover is designed so that the probe cover cannot be installed on the attachment 50 if there is a form mismatch and thus use of an incompatible probe cover is prevented.

Figure 6:
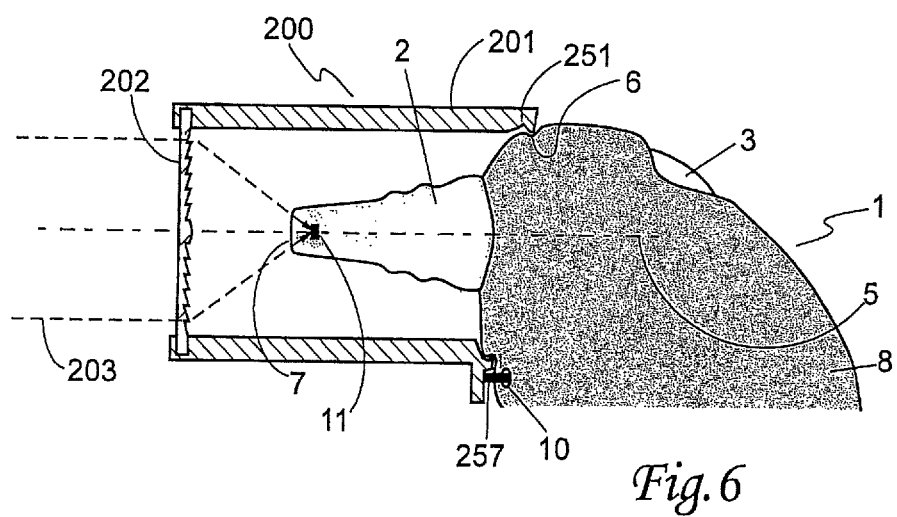
FIG. 6 represents an optical attachment with a Fresnel lens according to one embodiment of the present invention.

FIG. 6 illustrates another embodiment where remote attachment 200 converts an IR ear thermometer 1 into a remote thermometer that can measure temperature from an appreciable distance with no physical contact with the patient. As one with skill in the art can appreciate the ability to measure a temperature serves many benefits, both from a hygienic perspective and convenience when dealing with either a pediatric or uncooperative patient. The remote attachment 200 comprises the body 201 having a Fresnel lens 202 that is installed at its distal end. The lens 202 is positioned to have its focus at the point where the IR sensor 11 is located on the optical axis 5 inside the probe 2. Since the IR sensor is positioned at the focal point, the lens 202 converges the parallel beam 203 into the IR sensor's surface and thus makes the thermometer reading much less sensitive to the distance from the patient's skin. The attachment 200 is preferably snapped on the thermometer 1 by the complimentary snaps 251 and 6. Similar to the previous embodiments, the pin 257 engages the switch 10 to signal the internal electronic circuit on installation of the attachment 200. It will be appreciated by one of ordinary skill in the art that switch 10 can have multiple settings to account for various different attachments that may be mated with thermometer 1. For example, it may have one setting for skin contact measurement, one setting for measurement via the ear canal and a third setting for contact-less measurement that takes place at a further distance using a Fresnel lens for example. This way, the circuit can realize multiple manners in which the IR signal is used to measure temperature and account for that differentiation correctly.

One having ordinary skill in the art will recognize that the various mechanisms described for the preferred embodiments of the thermometers may be adapted and interchanged between the preferred embodiments, without significantly impacting the structure and operation of the thermometers.

Those skilled in the art will recognize that the method and system of the present invention has many applications, may be implemented in many manners and, as such is not to be limited by the foregoing embodiments and examples. Any number of the features of the different embodiments described herein may be combined into one single embodiment and alternate embodiments having fewer than or more than all of the features herein described are possible. Functionality may also be, in whole or in part, distributed among multiple components, in manners now known or to become known.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims. While there had been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art. It is the intention, therefore, to be limited only as indicated by the scope of the claims appended hereto. It is also to be understood that the following claims are intended to cover all of the generic and specific features of the invention herein disclosed and all statements of the scope of the invention that, is a matter of language, might be said to fall therebetween.

The invention claimed is:

1. An infrared thermometer comprising:
a body portion comprising one or more snap-fit elements, an electronic circuit that is configured to measure intensity of an infrared signal received from a patient and convert the infrared signal into an output that reflects the patient's body temperature and a first switch that is in communication with the electronic circuit;
a probe portion comprising an infrared window that is configured to accept the infrared signal received from the patient; and
an attachment mechanism having a first end capable of being coupled to the probe and a second end capable of being coupled to a probe cover that is configured to fit over the attachment mechanism, the attachment mechanism comprising a generally circular hollow bore at the second end, one or more snaps at the first end to engage the one or more snap-fit elements, a pin at the first end for interacting with the first switch, and an element movable in response to the attachment of the probe cover for enabling the electronic circuit to determine attachment of the probe cover;
wherein when the attachment mechanism is coupled to the probe and the pin interacts with the first switch in a first position, the electronic circuit converts the signal based upon a first calculation, when the pin interacts with the first switch in a second position the electronic circuit converts the signal based upon a second calculation, and the electronic circuit further converts the signal based upon the attachment of the probe cover.

2. The thermometer of claim 1 wherein the body further comprises a push button mechanism for activating the thermometer.

3. The thermometer of claim 1 wherein the attachment mechanism comprises ABS resin.

4. The thermometer of claim 1 wherein the first position is indicative of a temperature measurement taken via an ear canal and the second position is indicative of a temperature measurement taken via contact with the patient's skin.

5. The thermometer of claim 1 wherein the electronic circuit converts the signal based upon a third calculation when the pin interacts with the first switch in a third position.

6. The thermometer of claim 1 wherein the attachment mechanism further comprises a Fresnel lens at its distal end wherein the Fresnel lens is aligned along a longitudinal axis with the probe.

7. The thermometer of claim 1 wherein the probe cover further comprises a brim configured to allow the probe cover to be ejected.

8. The thermometer of claim 1 wherein the body portion comprises a second switch in communication with the electronic circuit, and the movable element comprises a bar slidably mounted in the attachment mechanism and extending from the first end of the attachment mechanism to the second end of the attachment mechanism, the slidable bar having a first end configured to engage with the second switch, and a second end configured to engage with the probe cover, and the electronic circuit converts the infrared signal based upon a position of the second switch.

9. An attachment mechanism for an infrared thermometer wherein the attachment mechanism comprises:
a generally circular hollow bore at its distal end;
one or more snaps to engage the infrared thermometer;
a pin at its proximal end for interacting with a first switch that is in communication with an electronic circuit that is configured to measure the intensity of an infrared signal received from a patient and convert the signal into an output that reflects the patient's body temperature; and an element movable in response to the attachment of the probe cover for enabling the electronic circuit to determine attachment of a probe cover configured to lit over the attachment mechanism;

wherein the generally circular hollow bore is configured to be aligned along the same longitudinal axis as a probe of the thermometer to enable the thermometer to measure the patient's temperature via a location other than the ear canal when the attachment mechanism is coupled to the thermometer.

10. The attachment mechanism of claim 9 wherein the attachment mechanism comprises ABS resin.

11. The attachment mechanism of claim 9 wherein when the pin interacts with the first switch in a first position, the electronic circuit converts the signal based upon a first calculation and when the pin interacts with the first switch in a second position, the electronic circuit converts the signal based upon a second calculation.

12. The attachment mechanism of claim 11 wherein the first position is indicative of a temperature measurement taken via an ear canal and the second position is indicative of a temperature measurement taken via contact with the patient's skin.

13. The attachment mechanism of claim 11 wherein the electronic circuit converts the signal based upon a third calculation when the pin interacts with the first switch in a third position.

14. The attachment mechanism of claim 9 wherein the attachment mechanism further comprises a Fresnet lens at its distal end wherein the Fresnel lens is aligned along the same longitudinal axis as the probe.

15. The attachment mechanism of claim 9 wherein the probe cover further comprises a brim configured to allow the probe cover to be ejected.

16. The attachment mechanism of claim 9, wherein the movable element comprises a bar slidably mounted in the attachment mechanism and extending from the proximal end to the distal end, the slidable bar having a first end configured to engage with a second switch in communication with the electronic circuit, and a second end configured to engage with the probe cover.

* * * * *